(12) United States Patent
Jackson

(10) Patent No.: US 7,705,877 B2
(45) Date of Patent: Apr. 27, 2010

(54) METHOD AND SYSTEM FOR DISPLAY OF FACIAL FEATURES ON NONPLANAR SURFACES

(75) Inventor: Warren Bruce Jackson, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1461 days.

(21) Appl. No.: 10/767,386

(22) Filed: Jan. 28, 2004

(65) Prior Publication Data

US 2005/0162511 A1 Jul. 28, 2005

(51) Int. Cl.
 *H04N 7/18* (2006.01)
(52) U.S. Cl. .................................. 348/61; 348/128
(58) Field of Classification Search ............ 348/61, 348/91, 128, 169, 207.99, 14.1; 345/32, 345/85, 419; 347/427; 382/118
See application file for complete search history.

(56) References Cited

U.S. PATENT DOCUMENTS

| | | | |
|---|---|---|---|
| 4,978,216 A | 12/1990 | Liljegren et al. | |
| 5,159,362 A | 10/1992 | Monroe et al. | |
| 5,850,225 A * | 12/1998 | Cosman | 345/427 |
| 5,923,469 A | 7/1999 | Machtig et al. | |
| 6,690,814 B1 * | 2/2004 | Yuasa et al. | 382/118 |
| 6,771,237 B1 * | 8/2004 | Kalt | 345/85 |
| 2002/0015037 A1 * | 2/2002 | Moore et al. | 345/419 |
| 2005/0017924 A1 * | 1/2005 | Utt et al. | 345/32 |
| 2006/0158522 A1 * | 7/2006 | Pryor | 348/207.99 |
| 2006/0187305 A1 * | 8/2006 | Trivedi et al. | 348/169 |

FOREIGN PATENT DOCUMENTS

| | | |
|---|---|---|
| JP | 03-58025 A | 1/1991 |
| JP | 04-227389 A | 8/1992 |
| JP | 05-168005 A | 7/1993 |
| JP | 05-205030 A | 8/1993 |
| JP | 06-6786 A | 1/1994 |
| JP | 06-343174 A | 12/1994 |
| JP | 07-30877 A | 1/1995 |
| JP | 8-6158 | 1/1996 |
| JP | 08-32948 A | 2/1996 |
| JP | 09-9230 A | 1/1997 |
| JP | 09-237154 A | 9/1997 |
| JP | 09-292850 A | 11/1997 |
| JP | 11-127275 A | 5/1999 |
| JP | 2000-83228 A | 3/2000 |
| JP | 2000-218575 A | 8/2000 |
| JP | 2001-215940 A | 8/2001 |
| JP | 2000-70557 A | 3/2003 |
| JP | 2003-205489 A | 7/2003 |
| JP | 2003-251580 A | 9/2003 |
| WO | 01041428 A1 | 6/2001 |

* cited by examiner

*Primary Examiner*—Gims S Philippe

(57) ABSTRACT

A method for displaying facial features includes generating an image with facial features on a nonplanar surface and positioning the image on the nonplanar surface to indicate a direction of gaze and enhance nonverbal communication associated with the facial features. The apparatus for displaying facial features includes a nonplanar surface, an image generation device that creates an image with facial features on the nonplanar surface and a positioning system that positions the image on the nonplanar surface to indicate a direction of gaze and enhance nonverbal communication associated with the facial features.

30 Claims, 8 Drawing Sheets

METHOD AND SYSTEM FOR DISPLAY OF FACIAL FEATURES ON NONPLANAR SURFACES

BACKGROUND

Video conferencing promises to greatly change the way people interact. In the age of expensive air travel, costly fossil fuels, terrorism and new infectious diseases, there is a great need for effective video conferencing. Effective video conferencing must attempt to achieve the impact of face-to-face meetings, i.e., to create a telepresence. In order to make video conferencing more like face-to-face interactions, a number of factors need improvement including: communicating nonverbal information to all participants, detecting and communicating gaze among each of the participants, maintaining eye contact as well as other visual and auditory information.

Current video conferencing and human-computer interaction technology often consists of the following: A local camera records a frontal image of a participant and transmits the information to a flat display in the remote location. The image of the remote participant is recorded using a remote camera and displayed on a local flat display to the local participant. Because the camera recording the image is not coincident with the display, the participants cannot maintain eye contact during speaking and listening. Moreover, it is difficult to determine the gaze location of the remote person (i.e., where the person is looking). Such nonverbal information provides an indication of the person's interest and level of involvement, comprehension, etc. Finally, the present video conferencing does not provide for good depth perception and three-dimensional presentation of images. Multiple camera angels require special glasses or goggles which have proved to have limited consumer appeal.

Likewise, in the case of human-computer interaction, a common approach is to project a flat animated image on a flat screen. The gaze of the computer figure is unrelated to the message or location of the human during the interaction. The displays are two-dimensional and are rather bulky, so use on mobile platforms such as robotics is difficult and expensive.

The current invention provides a solution to the above and other problems and provides a more lifelike communication experience through more realistic representation and display and gaze preservation during remote meetings.

BRIEF DESCRIPTION OF THE DRAWINGS

The present invention is illustrated by way of example and not limitation in the figures of the accompanying drawings in which.

SUMMARY OF THE INVENTION

One aspect of the present invention features a method for displaying facial features. The displaying operations include generating an image with facial features on a nonplanar surface and positioning the image on the nonplanar surface to indicate a direction of gaze and enhance nonverbal communication associated with the facial features.

Another aspect of present invention includes an apparatus for displaying facial features. This apparatus includes a nonplanar surface, an image generation device that creates an image with facial features on the nonplanar surface and a positioning system that positions the image on the nonplanar surface to indicate a direction of gaze and enhance nonverbal communication associated with the facial features.

DETAILED DESCRIPTION

Figure 1:
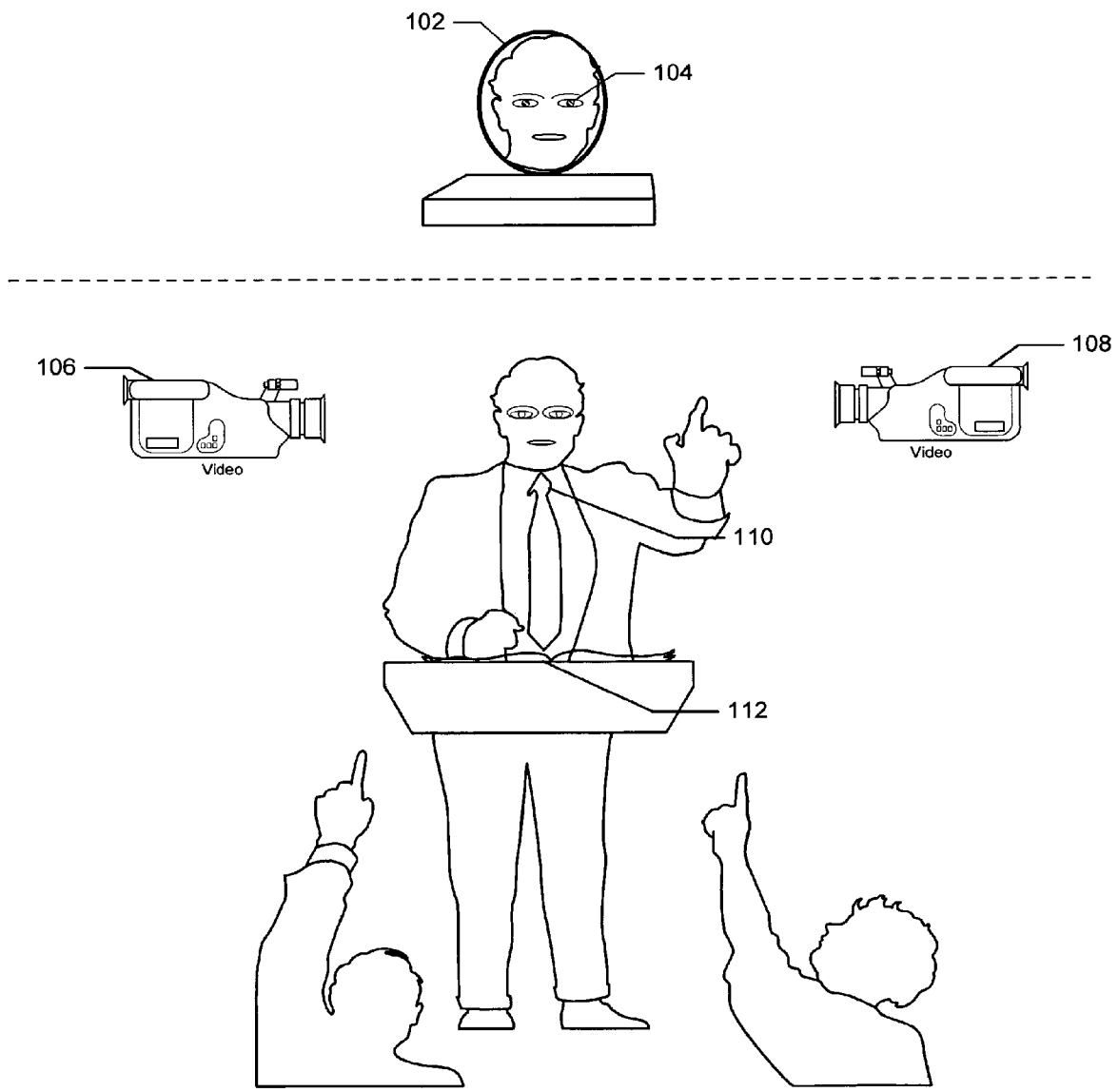
FIG. 1 is a schematic diagram showing an embodiment of the invention with a single remote user whose image is being collected by multiple external cameras.

FIG. 1 illustrates a video system using a non-planar display in accordance with one embodiment. System 100 includes a local user 110 in a first location, one or more cameras 106 and 108 in the first location, a microphone 112 in the first location, and a nonplanar display 102 with facial features 104 displayed on it at a second location.

Nonplanar display 102 in this embodiment includes a three-dimensional head shape with an image-generating display surface. In one embodiment the nonplanar display 102 is formed from flexible area-conserving projective display patches which are tiled to cover the surface of the nonplanar head. Designed to cover the surface exactly, the area-conserving patches fold over the nonplanar surface and intersect along their edges without overlap or gaps. In such an embodiment, a computer or other processing apparatus positions the image to appear on each display patch so that the facial features appear seamless to the local user.

Camera 106 and camera 108 take two corresponding video images of local user 110 while microphone 112 collects his speech. These devices then transmit the video and audio information for playback on nonplanar display 102 and speakers respectively. Implementations merge the images, correct for projection distortions, and display on nonplanar head display 102. When local user 110 rotates his head, the display system rotates the image on the nonplanar display 102. When local user 110 glances in one direction or another with his eyes, there are corresponding changes in the eye portion of the image 104. In this way, a direction of gaze and other indicators of emotional presence and nonverbal communication are clearly indicated for a person observing nonplanar display 102.

Figure 2:
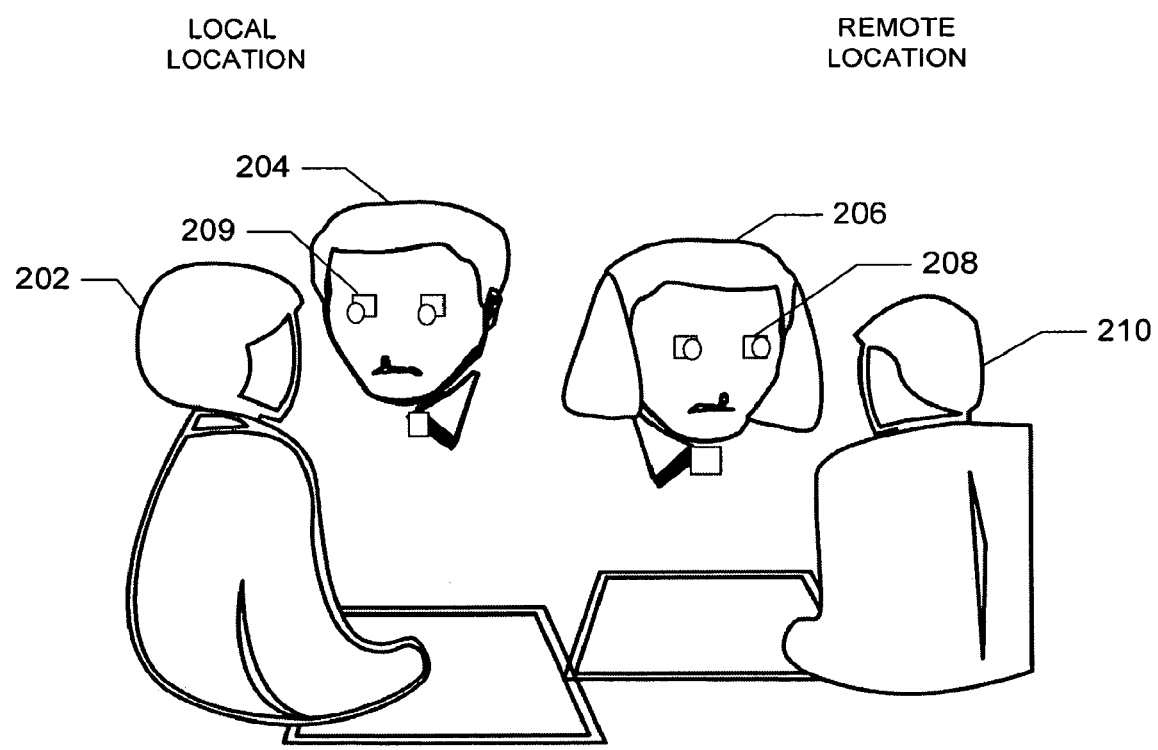
FIG. 2 is a schematic diagram showing two embodiments of the invention used simultaneously by two users at different locations for the purpose of teleconferencing.

FIG. 2 illustrates an embodiment for video conferencing used by a local user 202 and a remote user 210. This illustration shows an embodiment that collects perspective images to help preserve eye contact, gaze information, and other nonverbal cues of the local user. This arrangement includes a head-shaped nonplanar display 204 at the location of local user 202, a head-shaped nonplanar display 206 at the location of remote user 210 and cameras 208 embedded substantially at location of each eye of the facial images appearing on the respective displays.

During a meeting or other interaction, local user 202 addresses remote user 210 through cameras 209. The position of camera 209 combined with the image of remote user 210 on nonplanar display 204 helps local user 202 make eye contact or avert eye contact with remote user 210. Similarly, remote user 210 can control eye contact with local user 202 more readily by the position of cameras 208 combined with image of local user 208 on nonplanar display 204 positioned as illustrated. Perspective information gathered by the pair of cameras 208 and 209 greatly enhances the ability of both local user 202 and remote user 208 to discern nonverbal information. For example, the perspective information contains information regarding the symmetry or asymmetry of facial expressions, position of elements of the facial expression relative to gaze or eye contact or any other various parts of the facial expression used during personal communication.

Gaze information can similarly be preserved for remote user 210, by positioning one or more cameras on non-planar display 204 substantially at the location of one or both eyes of an image of remote user 210.

Figure 3A:
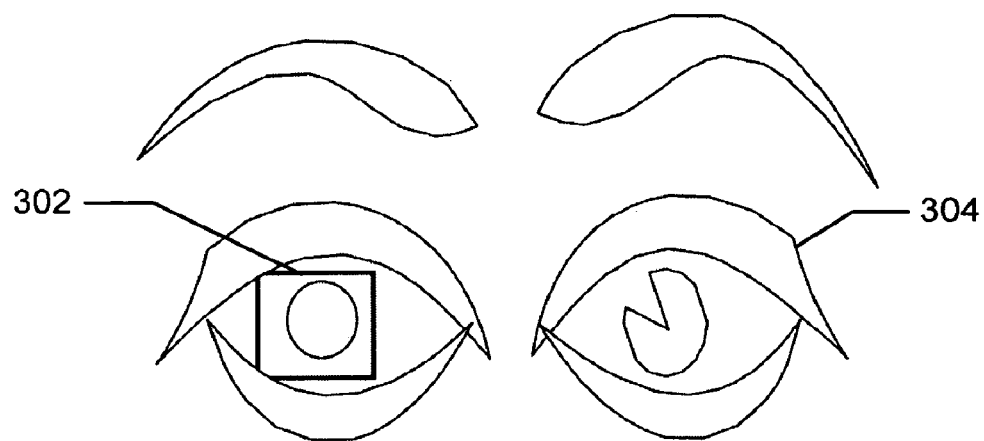
FIG. 3A is a perspective diagram showing a cutout of a nonplanar display in accordance with one embodiment of the present invention having a camera placed approximately behind one eye in order to transmit an image to a remote user while preserving gaze information.
Figure 3B:
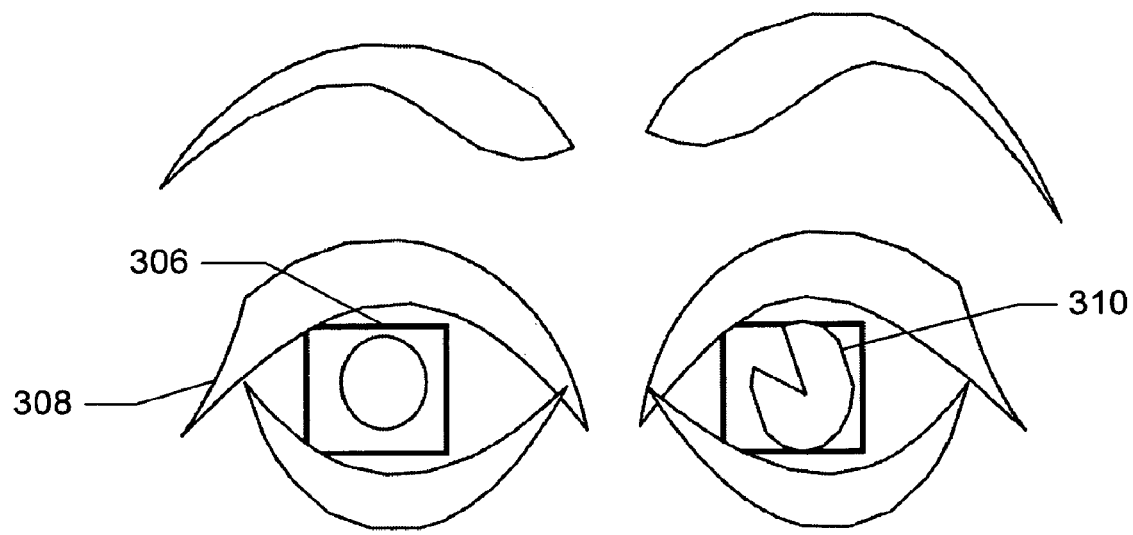
FIG. 3B is a perspective diagram showing a cutout of a nonplanar display designed in accordance with one embodiment and having a one camera placed approximately behind each eye in order to transmit an image to a remote user while preserving gaze information.
Figure 3C:
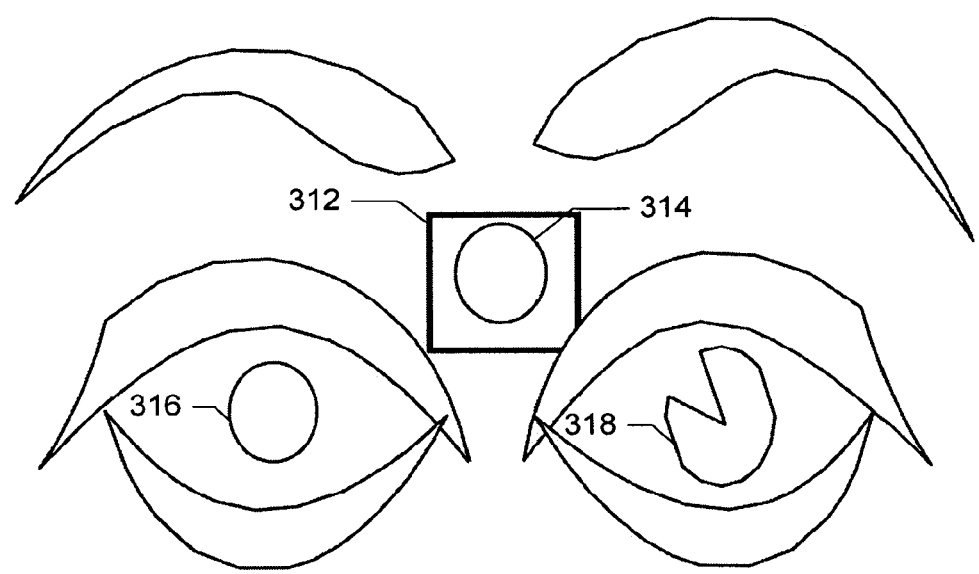
FIG. 3C is a perspective diagram showing a cutout of a nonplanar display also designed in accordance with one embodiment and having a camera placed approximately behind the bridge of the nose in order to transmit an image to a remote user while preserving gaze.

FIGS. 3A, 3B and 3C provide different camera arrangements for preserving gaze in accordance with different embodiments. In one implementation, illustrated in FIG. 3A, a camera 302 is located substantially in the region where one eye of the image would appear while no camera appears in area 304 corresponding to the other eye. In this arrangement, camera 302 gathers images from a point of view of the one eye and the area 304 from the other eye displays gaze information on the display surface. Gaze information from the single eye in area 304 preserves a degree of gaze while camera 302 collects gaze information for use elsewhere.

In another implementation, illustrated in FIG. 3B, a semi-transparent display 308 allows generation of the images of both eyes 310 of a remote user while simultaneously collecting video with one or more local cameras 306. In this arrangement, more gaze information is preserved from both eyes of the remote user as displayed on the nonplanar display. Similarly, the pair of cameras 306 gathers more gaze and perspective information from the local user for viewing by a remote user using a nonplanar or planar display or elsewhere in a video system. A greater degree of gaze and non-verbal information is preserved the closer the position of cameras 306 approximate the position of eyes 310 of the remote user on the non-planar display.

In yet another arrangement illustrated in FIG. 3C, a camera 312 collects video of a local user through an aperture 314 located approximately at the bridge of the nose of an image of facial features appearing on a nonplanar display. This embodiment exploits the inability of people to distinguish between gaze fixation on the bridge of the nose and gaze fixation on the eyes themselves. Camera 312 gathers gaze information from the local user yet does not preserve as much perspective information as the alternate embodiments described previously since camera is not positioned directly over either eye. However, eye 316 and eye 318 are displayed on the nonplanar display for the local user and appear to reflect the gaze of the remote user. Accordingly, this embodiment may be more cost effective to produce and yet still operate to preserve gaze.

Figure 4A:
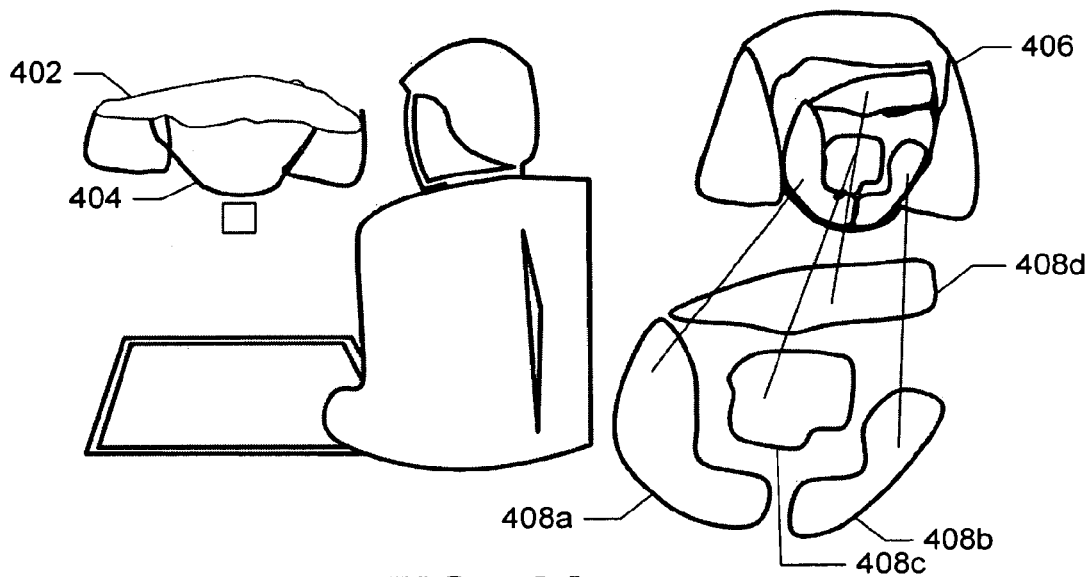
FIG. 4A is a perspective diagram showing one embodiment of the present invention in which a single flexible display is wrapped around a nonplanar surface and an alternate embodiment in which multiple flexible displays are tiled over a nonplanar surface.
Figure 4B:
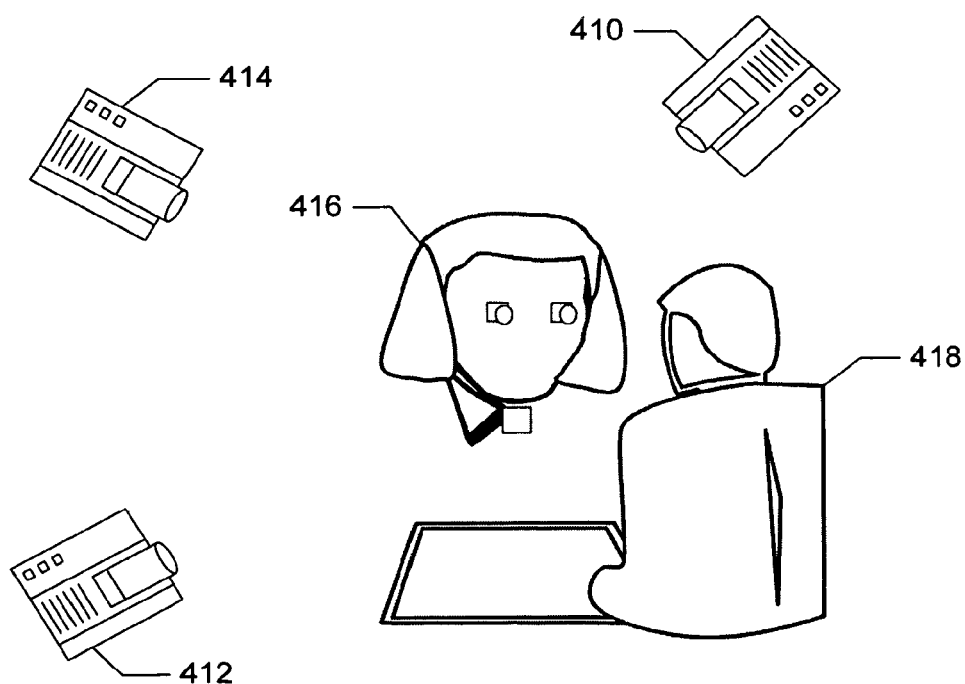
FIG. 4B is a perspective diagram showing a user interacting with a head-shaped nonplanar display in accordance with one embodiment of the present invention onto which facial features are projected from multiple angles.
Figure 4C:
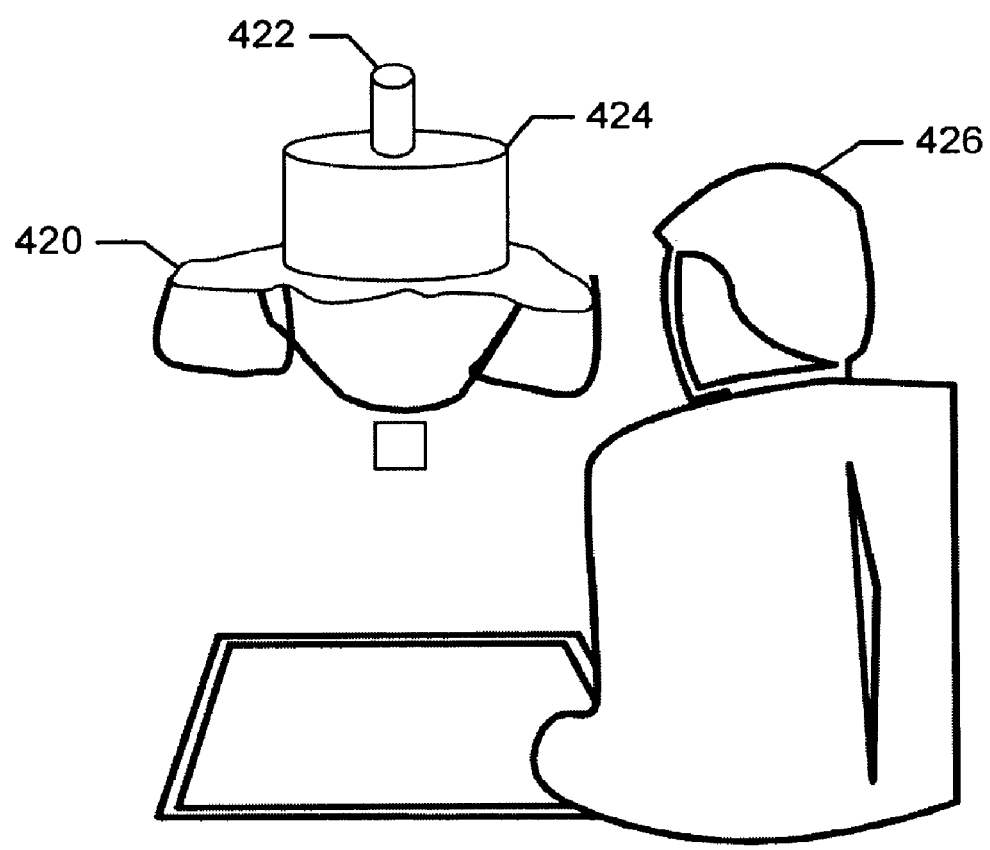
FIG. 4C is a perspective diagram showing an embodiment of the present invention making use of image projection from inside a semi-transparent nonplanar display.

FIGS. 4A, 4B and 4C illustrate various possibilities for generating facial images on a nonplanar surface in accordance with embodiments. FIG. 4A illustrates the use of a flexible display 402 affixed to a head-shaped nonplanar surface 404. Equal area mapping can also be used to construct a nonplanar display 406 from segments of flexible display having areas 408a, 408b, 408c and 408d. Equal area mapping is a design method mapping a curved surface onto a flat material so that the area remains the same and the flat, flexible material can cover the curved surface. In this example, area 408a is flexible display material that corresponds to right cheek portion of the remote user, area 408b corresponds to the left check portion of the remote user, area 408c corresponds to the central facial area of the remote user and area 408d corresponds to the forehead region of the remote user. A flexible display material covering these various areas would describe gaze, facial expression, gestures through perspective and many other nonverbal cues.

FIG. 4B illustrates an embodiment in which multiple projectors 410, 412 and 414 create an image on a nonplanar display surface 416 for presentation to a local user 418. This embodiment has the advantage of using currently available technologies and therefore can be implemented most readily and at lower costs. Nonplanar surface 416 can be implemented using a cylindrical surface or a mannequin head or other surface resembling the three-dimensional head of a person.

Using projector 410, 412 and 414 on nonplanar display 416 may also require additional processing and image enhancement operations to work properly. Image processing routines can process the image of the remote user to keep the face centered on the center axis of nonplanar display surface 416. Face recognition operations can be used to identify a center axis of the remote user being videoed as compared with the center axis of nonplanar display 416. The center axis of the remote user can be aligned by shifting one or more images being taken of the remote user until the axis position is coincident with nonplanar display surface 416.

Another embodiment can process and correct facial features not properly reproduced on nonplanar display 416. For example, objects or distortions introduced by a camera taking images of the remote user can cause facial features to become potentially obscured and leave shadows. Statistical information on facial features or expressions can be used to recreate these areas or dropouts instead of showing shadows or dark areas. For example, recognizing a relatively flat area on the check or forehead can be used to smooth or approximate areas in these regions and provide continuity in the displayed image. This will provide sufficiently accurate reproduction of facial features to maintain gaze and avoid distraction due to some aberration.

Yet another image processing aspect could resolve relatively small head movement of the remote user. In this case, face recognition and eye tracking routines would also be used to identify the rotational position of the remote user's head relative to the camera taking the images. To maintain gaze and eye contact with local user 418, cameras 416 taking images of the local user would be altered to reflect the new eye position of the remote user. For example, implementations could collect and use images taken from a right or left cameras 416 depending on the degree of head rotation from the remote user. By using either the resulting left image, right image or combination thereof, the remote user may see a different perspective taken of local user 418 along with a new and more accurate eye contact position.

FIG. 4C illustrates a system for internal projection on a semitransparent nonplanar surface in accordance with one embodiment. This system includes a semitransparent nonplanar surface 420, a light source 422, and a liquid crystal light valve 424 for presentation of an image to a local user 426. Light valve 424 filters light source 422 and projects the resulting image onto semitransparent nonplanar surface 420. This system is advantageous as display source and semitransparent nonplanar surface 420 are self-contained and portable. Like the other previously described systems, the projected image of the remote user includes facial expressions and preserves gaze and other nonverbal cues for local user 426.

Figure 5:
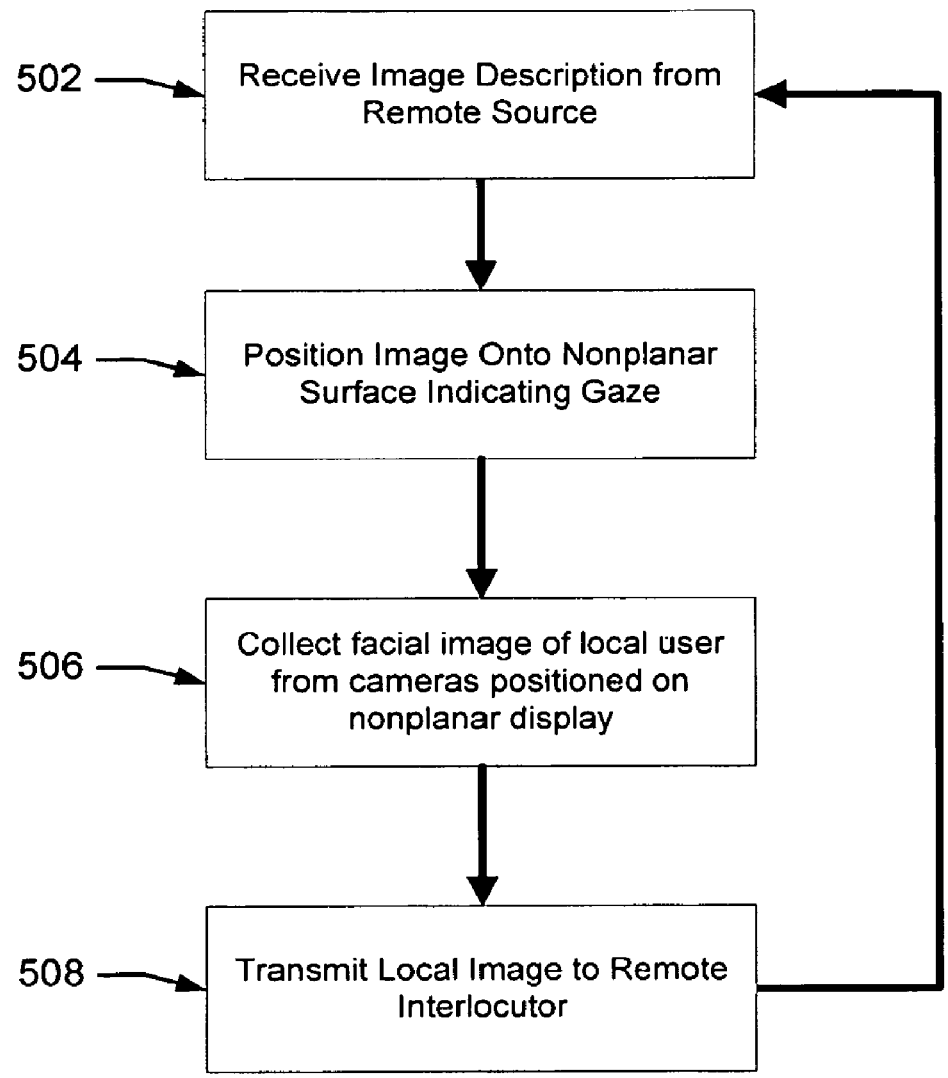
FIG. 5 is a flowchart of operations that displays facial features of a remote user and transmits a local user's image to the remote user in accordance with one implementation of the present invention.

FIG. 5 is a flowchart illustrating the steps involved in gathering and displaying facial features of a user on a nonplanar display in accordance with one embodiment. Initially, a nonplanar display device receives one or more images of a remote user's facial features (502). As previously described, one or more cameras can be used to gather the images and then display them on the nonplanar display device. For example, cameras can be located substantially coincident with each eye positioned on the nonplanar display, one eye on the nonplanar display or between a pair of eyes at approximately the bridge of the nose.

The image taken of the remote user is then positioned onto the nonplanar surface indicating a gaze of the remote user to a local user (504). The facial expression of the remote user preserves gaze by positioning the eyes in the image at or near the location that eyes would appear on the nonplanar display. Also, perspective information gathered from different images helps convey gaze and other nonverbal information to the local user viewing the nonplanar display. As previously described, the facial image can be projected onto the nonplanar display with several projectors, displayed with flexible displays attached to a nonplanar surface or displayed through an internal projection of the image from within a semitransparent nonplanar surface.

Simultaneous or parallel to the above operations, cameras positioned on the nonplanar display near the local user collect images of the local user's facial image or expression (506). Multiple images may collect different perspectives of the local user to enhance capture of the local user's gaze and other nonverbal cues as well. Depending on the application, various image processing routines may be applied to the images collected to correct for head rotation, head tilt and other variations in the image that may interfere with the preservation of gaze and eye contact between remote and local users. Once this processing is complete, the images of the local user are transmitted for display on the nonplanar display of the remote user (508) and the above operations are repeated. While the above operations are provided in a particular sequence, it is understood that the operations above could occur entirely in parallel or in various order to improve the performance and efficiency of imaging on the nonplanar display.

Figure 6:
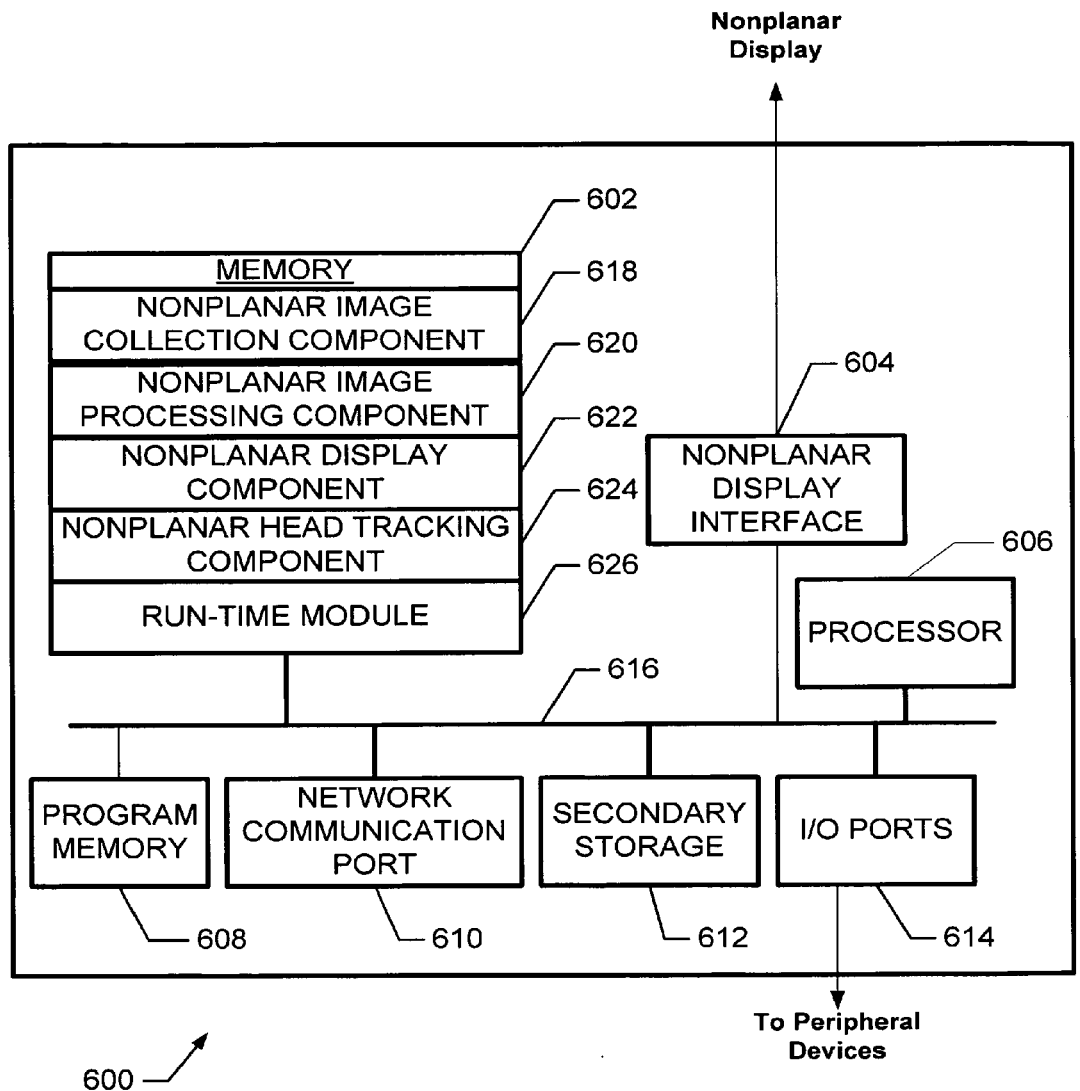
FIG. 6 is a block diagram of a system used in one implementation for performing the apparatus or methods of the present invention.

FIG. 6 is a block diagram of a system 600 used in one implementation for performing the apparatus or methods detailed here. System 600 includes a memory 602 to hold executing programs (typically random access memory (RAM) or read-only memory (ROM) such as a flash ROM), a presentation device interface 604 capable of interfacing and driving a display or output device, a processor 606, a program memory 608 for holding drivers or other frequently used programs, a network communication port 610 for data communication, a secondary storage 612 with a secondary storage controller and input/output (I/O) ports and controller 614 operatively coupled together over a bus 616. System 600 can be preprogrammed, in ROM, for example, using field-programmable gate array (FPGA) technology or it can be programmed (and reprogrammed) by loading a program from another source (for example, from a floppy disk, a CD-ROM, or another computer). Also, system 600 can be implemented using customized application specific integrated circuits (ASICs).

In one implementation, memory 602 includes a nonplanar image collection component 618, a nonplanar display component 620, a nonplanar image processing component 622, a nonplanar head tracking component 624 and a run-time module 626 that manages system resources used when processing one or more of the above components on system 600.

As illustrated, these various modules appear in a single computer system. However, alternate implementations could also distribute these components in one or more different computers to accommodate for processing demand, scalability, high-availability and other design constraints. Similarly, components illustrated in FIG. 6 that appear to be discrete and separate from each other. An alternate implementation could combine one or more of these components to effectuate higher efficiencies, lower costs or any other design constraint needed to implement embodiments in a large-scale enterprise or small-scale operating environment.

Nonplanar image collection component 618 gathers images of the local user from one or more cameras associated with the nonplanar display. Nonplanar image processing component 620 performs one or more image processing operations on images collected to improve the resulting display on the nonplanar display. As previously described, these image processing operations include compensating for tilt of the head of a remote user, accounting for rotation of the head of the remote user, smoothing areas of the facial image subject to aberration or distortion as well as any other process to enhance preservation of gaze and/or other nonverbal cues.

Nonplanar display component 622 further processes the images and prepares for the particular display designed in accordance with the details set forth herein. This nonplanar display component 622 may modify the image to better operate with projectors, flexible display devices, display meant for the inside of a nonplanar display or any other various embodiments.

Nonplanar head tracking component 624 includes one or more operations that track the position of the head of the remote user when collecting and transmitting the images. This nonplanar head tracking component 624 may implement operations that track a remote user's eyes as well as the complete facial features of the remote user.

While examples and implementations have been described, they should not serve to limit any aspect of the present invention. Accordingly, implementations of the invention can be implemented in analog circuitry, in digital electronic circuitry, or in computer hardware, firmware, software, or in combinations of them. Apparatus of the invention can be implemented by using analog electronics, or digital electronics in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs.

While specific embodiments have been described herein for purposes of illustration, various modifications may be made without departing from the spirit and scope of the invention. For example, a variety of display technologies are commercially available and could be used to embody the described invention. Moreover, the preparation of the image to be presented can be performed in a variety of ways. Images appearing on the nonplanar surface might be those of a remote user captured by video camera and then processed and prepared by a computer algorithm or computer hardware, or might be generated by a computer for the purpose of human-computer interaction. Accordingly, the invention is not limited to the above-described implementations, but instead is defined by the appended claims in light of their full scope of equivalents.

What is claimed is:

1. An apparatus for displaying facial features of a remote person comprising:
    a nonplanar surface;
    an image generation device that creates an image with facial features of the remote person on the nonplanar surface, wherein the image is communicated by an image collection device configured to track a direction of gaze of the remote person; and
    a positioning system that moves the image on the nonplanar surface to indicate changes in the direction of gaze and enhance nonverbal communication associated with the facial features of the remote person.

2. The apparatus of claim 1, wherein the nonplanar surface has substantially the shape of a head.

3. The apparatus of claim 1, wherein the substantially head shaped nonplanar surface is selected from a set of head shapes including: a sphere, a spheroid, or an oblong closed surface.

4. The apparatus of claim 1, wherein the nonplanar surface has substantially the shape of a face.

5. The apparatus of claim 4, wherein the substantially face shaped nonplanar surface is selected from a set of face shapes including: a portion of a sphere, an oblong open nonplanar surface, or an oblong nonplanar closed surface with one flat side.

6. The apparatus of claim 1, wherein the image generation device comprises one or more projection devices projecting light from outside the nonplanar surface.

7. The apparatus of claim 1, wherein the image generation device comprises one or more projection devices projecting light from within the nonplanar surface.

8. The apparatus of claim 1, wherein the image generation device comprises a flexible display substantially coincident with the nonplanar surface.

9. The apparatus of claim 1, wherein the image generation device is implemented using a flexible display technology selected from a set including: a flexible LCD display, a flexible organic light emitting diode display, a flexible inorganic electroluminescent display, and a flexible light-emitting polymer display.

10. The apparatus of claim 1, wherein the facial features being projected onto the nonplanar surface is created from a live transmission of images from the image collection device.

11. The apparatus of claim 1, wherein the facial features are selected from a set including those of: a fantasy face, a cartoon face, an animal face, and a human face.

12. The apparatus of claim 1, wherein the positioning system moves the image and eyes contained in the image from one part of the nonplanar surface to another in conjunction with movement of the facial features gathered with the image collection device.

13. The apparatus of claim 1, further comprising one or more video collection devices for collecting video images of facial features from a perspective substantially on or near the nonplanar surface.

14. The apparatus of claim 1, wherein the one or more video collection devices includes a camera device, and the perspective substantially on or near the nonplanar surface includes mounting the camera device substantially near a set of eyes appearing on the nonplanar surface.

15. The apparatus of claim 1, wherein the one or more video collection devices includes a camera device and the perspective substantially on or near the nonplanar surface includes mounting the camera device substantially at the location of one eye appearing on the nonplanar surface.

16. The apparatus of claim 1, wherein one or more video collection devices includes a camera device and the perspective substantially on or near the nonplanar surface includes mounting the camera device substantially at the location of each eye appearing on the nonplanar surface.

17. The apparatus of claim 1, further comprising a speaker to transmit voice and other sounds from the perspective of the nonplanar surface.

18. The apparatus of claim 1, wherein the speaker is located substantially at the location of a mouth associated with the facial features appearing on the nonplanar surface.

19. The apparatus of claim 1, further comprising one or more microphones to gather sounds audible from the perspective of the nonplanar surface.

20. The apparatus of claim 1, wherein each of the one or more microphones is located substantially at the location of an ear of the image appearing on the nonplanar surface.

21. A method for displaying facial features of a remote person comprising:
    receiving communications from an image collection device, said communications including information pertaining to a direction of gaze of the remote person;
    generating an image with facial features of the remote person on a nonplanar surface; and
    moving the image on the nonplanar surface to indicate changes in the direction of gaze and enhance nonverbal communication associated with the facial features of the remote person.

22. The method of claim 21, wherein the generating is done by a video projection device projecting from outside the nonplanar surface.

23. The method of claim 21, wherein the generating is done by a video projection device projecting from inside the nonplanar surface.

24. The method of claim 21, wherein the generating is done by a curved display substantially coincident with the nonplanar surface.

25. The method of claim 21, comprising the additional step of collecting one or more live video images from a perspective on or near the nonplanar surface.

26. The method of claim 21, further comprising the step of transmitting the live video images to a remote user.

27. The method of claim 21, wherein the collecting step comprises the collection of images from a perspective in the region of the eyes of the facial features on the nonplanar surface.

28. The method of claim 21, comprising the additional step of collecting one or more live audio feeds to gather sounds audible from the perspective of the nonplanar surface.

29. The method of claim 21, comprising the additional step of transmitting the live video feeds to a remote user.

30. An apparatus for displaying facial features of a remote person comprising:
- means for receiving communications from an image collection device, said communications including information pertaining to a direction of gaze of the remote person;
- means for displaying an image on a nonplanar surface;
- means for generating facial features of the remote person in the image on the nonplanar surface; and
- means for moving the image to indicate changes in the direction of gaze and enhance nonverbal communication associated with the facial features of the remote person.

* * * * *

UNITED STATES PATENT AND TRADEMARK OFFICE
CERTIFICATE OF CORRECTION

PATENT NO. : 7,705,877 B2
APPLICATION NO. : 10/767386
DATED : April 27, 2010
INVENTOR(S) : Warren Bruce Jackson It is certified that error appears in the above-identified patent and that said Letters Patent is hereby corrected as shown below:

In column 7, line 55, in Claim 3, delete "claim 1," and insert -- claim 2, --, therefor.

In column 8, line 7, in Claim 9, delete "claim 1," and insert -- claim 8, --, therefor.

In column 8, line 29, in Claim 14, delete "claim 1," and insert -- claim 13, --, therefor.

In column 8, line 34, in Claim 15, delete "claim 1," and insert -- claim 14, --, therefor.

In column 8, line 39, in Claim 16, delete "claim 1," and insert -- claim 14, --, therefor.

In column 8, line 47, in Claim 18, delete "claim 1," and insert -- claim 17, --, therefor.

In column 8, line 53, in Claim 20, delete "claim 1," and insert -- claim 19, --, therefor.

In column 9, line 13, in Claim 26, delete "claim 21," and insert -- claim 25, --, therefor.

In column 9, line 15, in Claim 27, delete "claim 21," and insert -- claim 25, --, therefor.

In column 10, line 4, in Claim 29, delete "claim 21," and insert -- claim 28, --, therefor.

Signed and Sealed this
Eighth Day of May, 2012

David J. Kappos
*Director of the United States Patent and Trademark Office*